US008483637B2

(12) United States Patent  
Nakayama et al.

(10) Patent No.: US 8,483,637 B2  
(45) Date of Patent: Jul. 9, 2013

(54) METHOD AND APPARATUS FOR A BROADCAST RADIO RECEIVER TO GENERATE AN ELECTRONIC PROGRAM GUIDE

(75) Inventors: Yotetsu Nakayama, Machida (JP); Tetsuya Okamoto, Hachiouji (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 34 days.

(21) Appl. No.: 13/324,233

(22) Filed: Dec. 13, 2011

(65) Prior Publication Data

US 2012/0149318 A1 Jun. 14, 2012

(30) Foreign Application Priority Data

Dec. 14, 2010 (JP) .................................. 2010-277677

(51) Int. Cl.  
*H04B 1/16* (2006.01)

(52) U.S. Cl.  
USPC ...................... 455/154.1; 455/323; 455/161.1

(58) Field of Classification Search  
USPC ................ 455/154.1, 158.1, 158.4, 313, 323, 455/337, 414.1  
See application file for complete search history.

(56) References Cited

U.S. PATENT DOCUMENTS

| 2002/0055343 A1* | 5/2002 | Stetzler et al. ................ 455/260 |
| 2007/0143816 A1 | 6/2007 | Gupta et al. |
| 2010/0060786 A1* | 3/2010 | Kim et al. ..................... 348/463 |
| 2010/0203856 A1* | 8/2010 | Jitsuhara ................... 455/150.1 |

FOREIGN PATENT DOCUMENTS

| EP | 0632577 A1 | 1/1995 |
| JP | 2000-244832 A | 9/2000 |
| JP | 2006-174117 A | 6/2006 |

* cited by examiner

*Primary Examiner* — Blane J Jackson  
(74) *Attorney, Agent, or Firm* — Marvin A. Motsenbocker; Mots Law, PLLC

(57) ABSTRACT

A radio receiver converts received RF signals in a predetermined frequency band into digital RF signals, converts the digital RF signals into IF signals corresponding to RF signals whose carrier frequencies are different from one another, converts one of the digital RF signals into an IF signal corresponding to an RF signal whose carrier frequency matches a selection input made by a user, outputs audio data included in the converted IF signal corresponding to the RF signal whose carrier frequency meets the selection input made by the user, extracts sets of program information, respectively, from the converted IF signals corresponding to the RF signals, generates an electronic program guide by listing the extracted sets of program information in association with the carrier frequencies of the RF signals from which the sets of program information are extracted, and displays an image representing the electronic program guide.

4 Claims, 6 Drawing Sheets

METHOD AND APPARATUS FOR A BROADCAST RADIO RECEIVER TO GENERATE AN ELECTRONIC PROGRAM GUIDE

CROSS REFERENCE TO RELATED APPLICATIONS

This application claims priority based on 35 USC 119 from prior Japanese Patent Application No. 2010-277677 filed on Dec. 14, 2010, entitled "RADIO RECEIVER, RADIO RECEPTION METHOD AND PROGRAM", the entire contents of which are incorporated herein by reference.

BACKGROUND OF THE INVENTION

1. Field of the Invention

The present disclosure relates to a radio receiver, a radio reception method and a program.

2. Description of Related Art

Nowadays, an electronic program guide (hereinafter abbreviated as "EPG") has become widely used in conjunction with the switchover from analogue to digital television broadcasting. Users select and/or record television programs they like by referring to an EPG.

The following exemplary system for displaying an EPG by use of a television broadcast wave is disclosed in Japanese Patent Application Publication No. 2000-244832 (hereinafter referred to "Document 1"). In this system, two tuners are provided for a receiver. A broadcast station transmits sets of program information in a transport stream (hereinafter abbreviated as "TS") dedicated to program information that includes all sets of program information on programs aired by other broadcast stations. The receiver is tuned to the frequency of the TS for program information by use of a tuner specialized for EPG, which is one of the two tuners installed in the receiver. This tuner displays an EPG through a demodulation and decoding of the TS and is independent of the second tuner used for tuning to a program to be viewed.

In addition, Japanese Patent Application Publication No. 2006-174117 (hereinafter referred to "Document 2") discloses the following digital terrestrial television broadcast receiver. The receiver updates an EPG by sequentially acquiring sets of program information transmitted by all the broadcast stations while the user is viewing no television program (or while the power supply is off). Once the user turns on the power supply, the receiver displays the EPG based on the updated sets of program information.

SUMMARY OF THE INVENTION

There is a growing demand today for EPG in the ground-wave radio broadcasting as well and, like television broadcasting, ground-wave radio broadcasting is also in the process of switching over from analog to digital. Relative to this background, the technologies described in Documents 1 and 2 are considered to be usable methods for displaying an EPG from a radio broadcast wave.

The receiver of Document 1 needs to use not only the tuner for tuning programs to be viewed, but also the tuner specialized for EPG. This makes the receiver higher in cost. In addition, an on-vehicle radio receiver that uses the technology described in Document 1, is likely to not display the EPG satisfactorily for meeting the user's needs. More particularly, because mobile signal reception is a prerequisite for an on-vehicle radio receiver, use of the technology of document 1 is likely to cause the radio receiver's reception of some program signal to change at every moment in a way that the signal is receivable at one moment but not at the next moment. In addition to this problem, when an EPG is displayed that includes sets of program information on the programs aired by all the broadcast stations, the displayed EPG is likely to contain sets of program information on unreceivable programs that are included in the displayed EPG. Naturally the user is disappointed when it selects a broadcast station by referring to the displayed set of program information only to find that the selected program cannot be listened to because it is actually not receivable.

With respect to Document 2, the technology it describes updates sets of program information only when the power supply is off, except for the set of program information from a broadcast station whose program the user is currently viewing. If the power supply is off for a shorter time than the time needed to update the sets of program information from all the broadcast stations, the sets of program information from some broadcast stations may fail to be updated. This prevents the user from being able to check the latest sets of program information from some broadcast stations.

In consideration of the foregoing problems, one embodiment of the invention is to provide a radio receiver, a radio reception method and a program which are capable of displaying an EPG that contains sets of program information on only receivable programs, with a simple configuration and irrespective of whether a power supply is on or off.

A first aspect of the invention is a radio receiver that includes: a reception unit configured to receive RF signals in a predetermined frequency band; an A/D converter configured to convert the RF signals in the predetermined frequency band, which the reception unit receives, into digital RF signals; a plurality of mixer function units configured to convert the digital RF signals into IF signals corresponding to RF signals whose carrier frequencies are different from one another; a radio dial selector configured to cause any one of the plurality of mixer function units to convert one of the digital RF signals into an IF signal corresponding to an RF signal whose carrier frequency meets, or matches, a selection input made by a user; an audio controller configured to cause an audio output unit to output audio data included in the converted IF signal corresponding to the RF signal whose carrier frequency is the same as, or meets, the selection input made by the user; a data extractor configured to extract respective sets of program information from the converted IF signals corresponding to the RF signals whose carrier frequencies are different from one another; an electronic program guide generator configured to generate an electronic program guide by listing the extracted sets of program information in association with the carrier frequencies of the RF signals from which the sets of program information are extracted; and a display configured to display an image representing the electronic program guide.

A second aspect of the invention is a radio reception method that includes: receiving RF signals in a predetermined frequency band; converting the received RF signals in the predetermined frequency band into digital RF signals; converting the digital RF signals into IF signals corresponding to RF signals whose carrier frequencies are different from one another; converting one of the digital RF signals into an IF signal corresponding to an RF signal whose carrier frequency matches a selection input made by a user; causing an audio output unit to output audio data included in the converted IF signal corresponding to the RF signal whose carrier frequency matches the selection input made by the user; extracting respective sets of program information from the converted IF signals corresponding to the RF signals whose carrier frequencies are different from one another; generating an electronic program guide by listing the extracted sets of program information associated with the carrier frequencies of the RF signals from which the sets of program information are extracted; and displaying an image representing the electronic program guide on a display.

A third aspect of the invention is a computer program to make a computer that is installed in a radio receiver configured to receive RF signals in a predetermined frequency band to function as: an A/D converter configured to convert received RF signals in a predetermined frequency band into digital RF signals; a plurality of mixer function units configured to convert the digital RF signals into IF signals corresponding to RF signals whose carrier frequencies are different from one another; a radio dial selector configured to cause any one of the plurality of mixer function units to convert one of the digital RF signals into an IF signal corresponding to an RF signal whose carrier frequency meets a selection input made by a user; an audio controller configured to cause an audio output unit to output audio data included in the converted IF signal corresponding to the RF signal whose carrier frequency meets the selection input made by the user; a data extractor configured to extract respective sets of program information from the converted IF signals corresponding to the RF signals whose carrier frequencies are different from one another; an electronic program guide generator configured to generate an electronic program guide by listing the extracted sets of program information associated with the carrier frequencies of the RF signals from which the sets of program information are extracted; and a display configured to display an image representing the electronic program guide.

DETAILED DESCRIPTION OF THE PREFERRED EMBODIMENT

A preferred embodiment of the invention is hereinbelow described in detail while referring to the accompanying drawings. Dimensions, materials, specific numbers and the like mentioned in the embodiment are just examples for the purpose of making the invention understood easily, and do not limit the invention unless otherwise specifically indicated. It should be noted that components having substantially the same function and constitution are denoted by the same reference signs, and duplicated explanations for them are omitted; and components having no direct relevance to the invention are omitted from the drawings.
(Radio Reception System 100)

Figure 1:
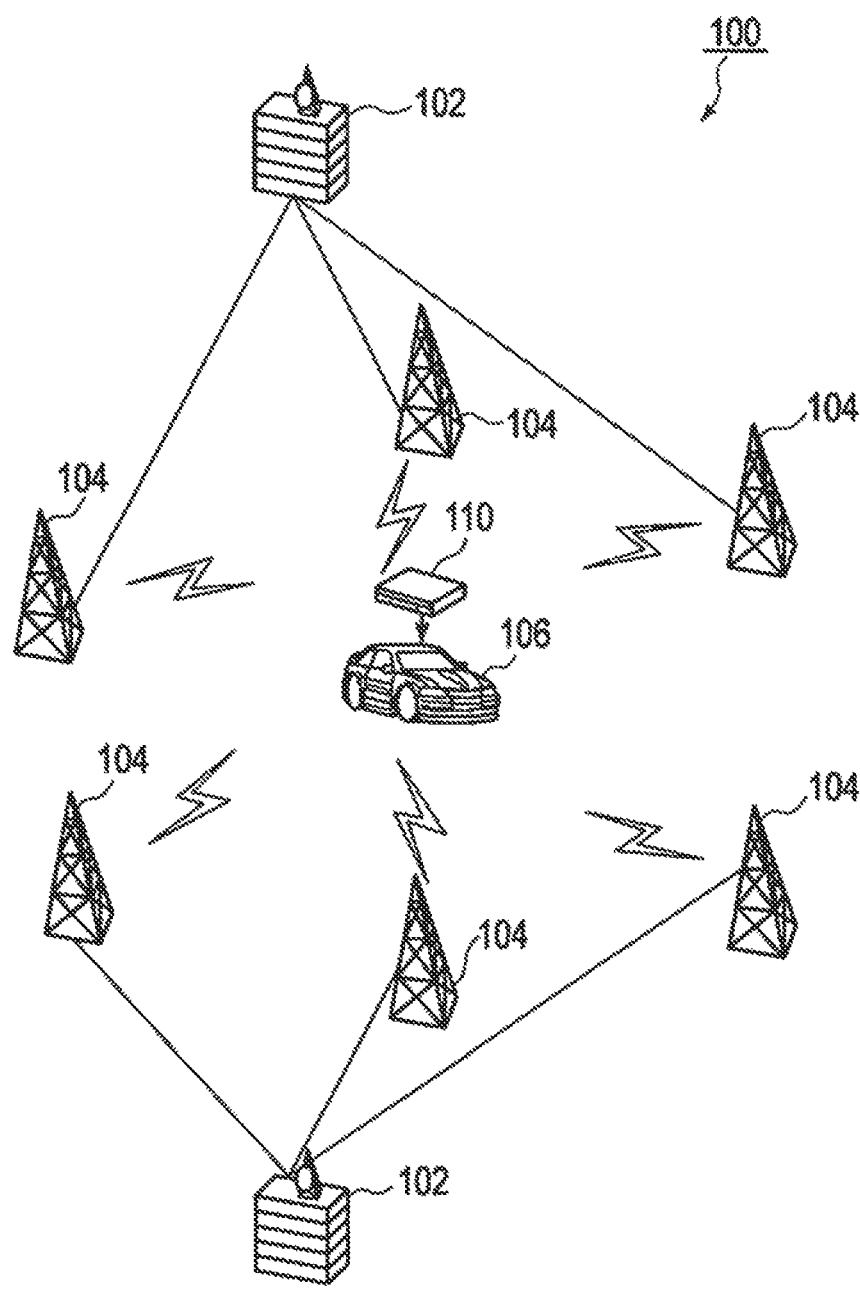
FIG. 1 is an explanatory diagram schematically showing a connection relationship of a radio reception system.

FIG. 1 is an explanatory diagram schematically showing a connection relationship of radio reception system 100. Radio reception system 100 includes multiple radio broadcast stations 102, multiple broadcast towers 104, and radio receiver 110.

Each radio broadcast station 102 provides its own radio frequency (RF) signal for ground-wave radio broadcasting. In addition, each radio broadcast station 102 is capable of superposing a data signal on an audio signal for its RF signal. Multiple broadcast towers 104 are placed in different locations, and transmit RF signals respectively having multiple carrier frequencies (frequencies of carrier waves) and broadcasted by multiple radio broadcast stations 102.

Radio receiver 110 receives RF signals having multiple carrier frequencies respectively, and broadcasted by the multiple radio broadcast stations 102, via broadcast towers 104. The radio receiver converts the received RF signals into IF (intermediate frequency) signals, and then outputs audio data through an audio output unit that includes a speaker or the like. The audio data is included in program data obtained by demodulating one of the IF signals.

There is a growing demand for an electronic program guide (EPG) to be displayed on radio receivers because there is an increased amount of transmittable information with the switchover of the analog ground-wave radio broadcast system to a digital one. The EPG display technology for the digital terrestrial television broadcasting is considered to be usable for radio receivers as well.

However, the prerequisite for EPG for terrestrial television broadcasting is that every television receiver set remains stationary in its location. For this reason, in many cases, each EPG includes respective sets of program information for all broadcast stations whose respective transmitted RF signal can be received in the location of the television receiver set. In contrast, a prerequisite for EPGs for radio receivers 110 is that every radio receiver 110 receives RF signals while in motion, because radio receiver 110 is often installed in a movable body such as an automobile. For this reason, the reception condition of each radio receiver 110 is likely to change every moment depending on carrier frequencies of the respective RF signals. If an EPG including respective sets of program information on all the radio broadcast stations 102 is designed to be displayed, then information on all sets of program information is displayed on radio receiver 110. As a result, when the user selects radio broadcast station 102 by referring to displayed information on an unreceivable program, the user is disappointed that the program is not receivable and hence cannot be listened to.

In consideration of this, an embodiment of the invention is to provide a radio receiver 110 capable of displaying an electronic program guide (EPG), which represents sets of information on only receivable programs, with a simple configuration irrespective of whether the receiver's power supply is ON or not. Hereinbelow, first of all, descriptions are provided for a configuration of radio receiver 110. Then, descriptions are provided for a radio reception method using radio receiver 110.

Figure 2:
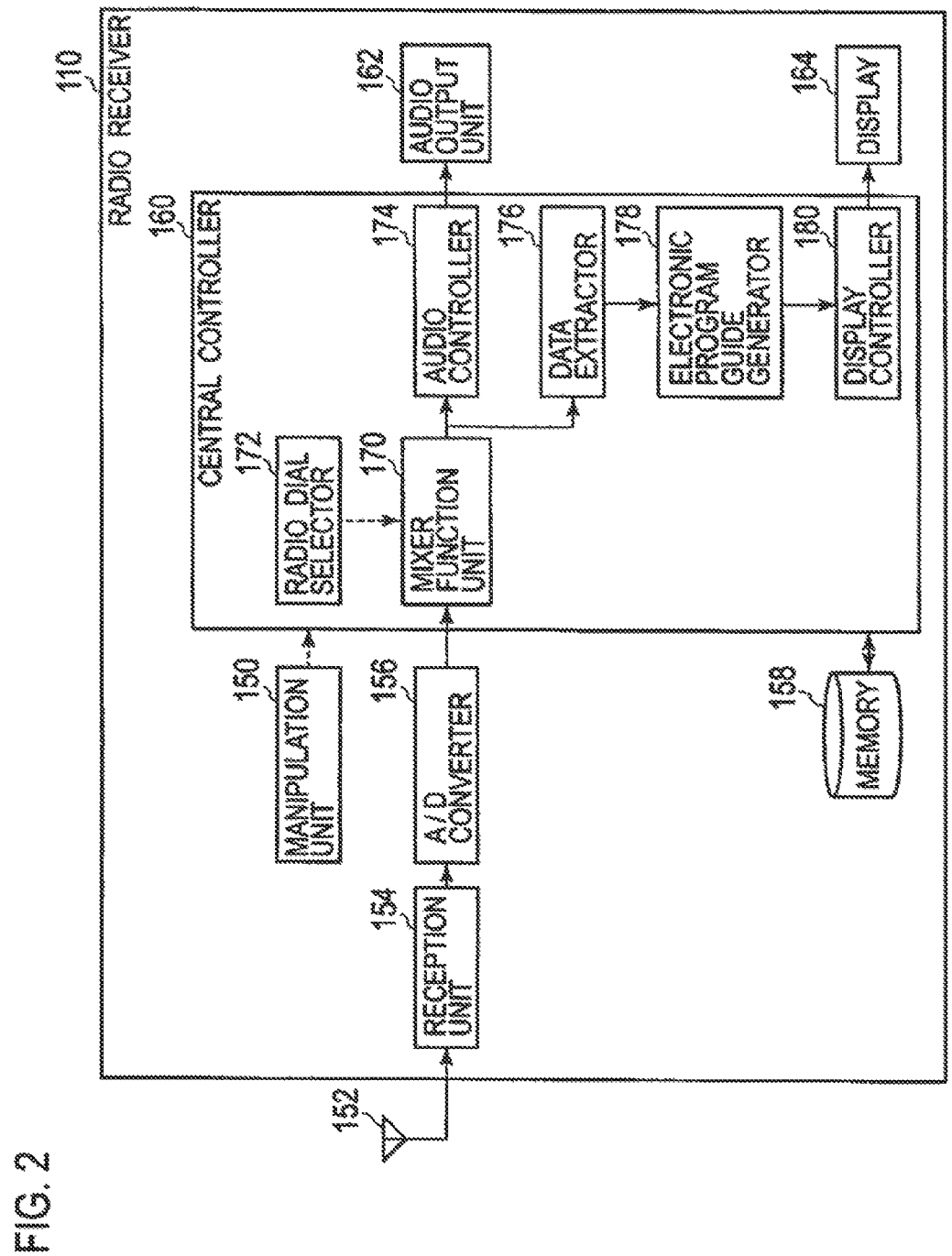
FIG. 2 is a functional block diagram schematically showing a configuration of a radio receiver.
Figure 3:
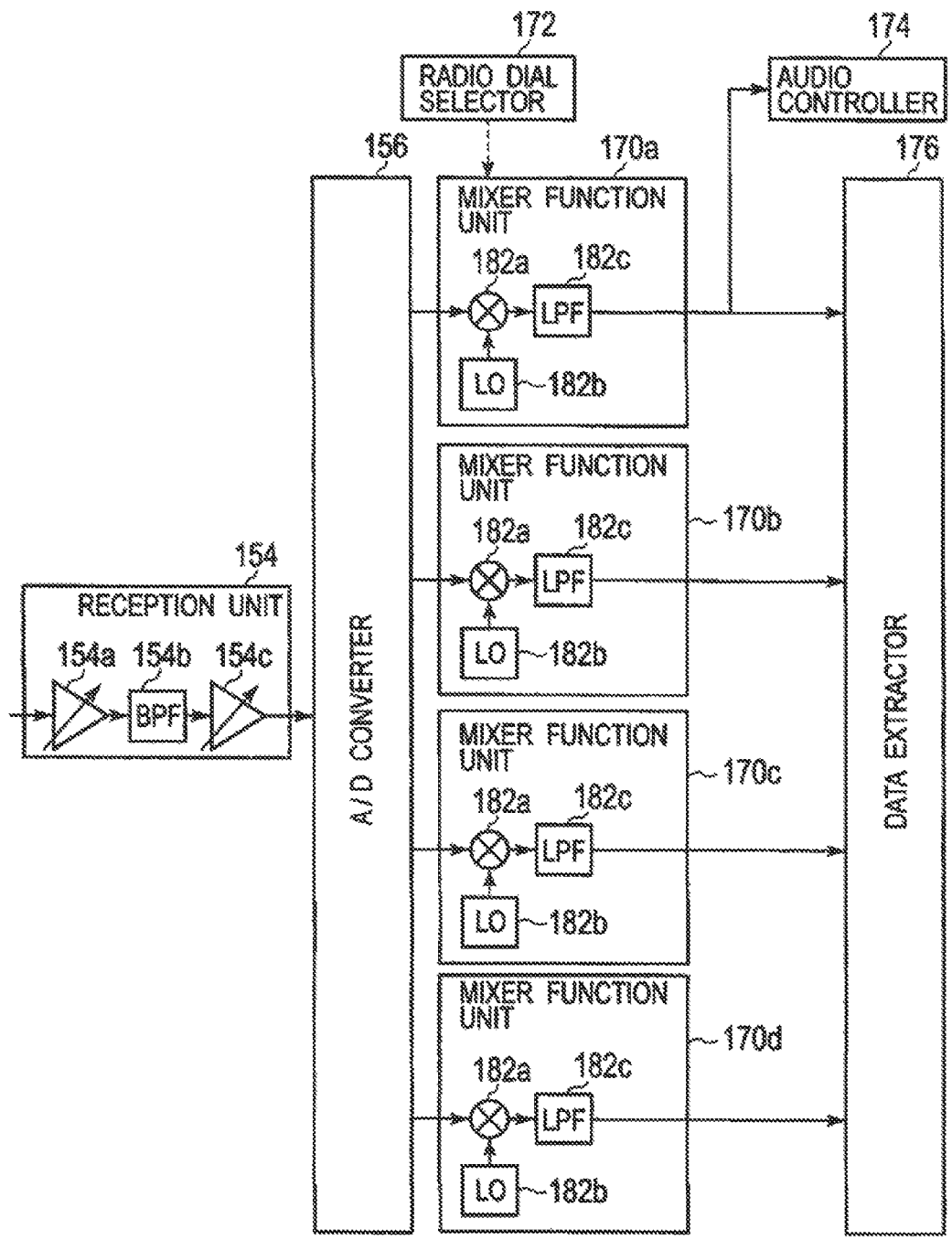
FIG. 3 is a functional block diagram showing the configuration of a radio reception system which includes a receiver, an A/D converter, mixer function units, a channel selector, an audio controller and a data extractor.

FIG. 2 is a functional block diagram showing the configuration of radio receiver 110. FIG. 3 is a functional block diagram showing the configuration of a radio reception system which includes reception unit 154, A/D converter 156, mixer function units 170, radio dial selector 172, audio controller 174 and data extractor 176. In FIGS. 2 and 3, the signal flow is indicated by an arrow with a continuous line, and a control flow is indicated by an arrow with a broken line.

As shown in FIG. 2, radio receiver 110 includes manipulation unit 150, antenna 152, reception unit 154, A/D converter 156, memory 158, central controller 160, audio output unit 162 and display 164.

Manipulation unit 150 includes manipulation keys, a cross key, a joystick, a jog dial, and a touch panel superimposed on display 164 which is described later, and the like. Antenna 152 receives broadband RF signals, inclusive of RF signals with the respective carrier frequencies corresponding to ground-wave radio broadcasts which are transmitted by multiple radio broadcast stations 102. Reception unit 154 converts the received the RF signals into processable signals.

As shown in FIG. 3, reception unit 154 includes: first amplifier 154a configured to amplify the RF signals; band-pass filter (BPF) 154b configured to filter RF signals within a certain bandwidth range; and second amplifier 154c. Reception unit 154 receives RF signals within a predetermined frequency band (for example, 87.5 MHz to 108.0 MHz), inclusive of RF signals having carrier frequencies and broadcasted by respective multiple radio broadcast stations 102. The RF signals received by the reception unit 154 are outputted to A/D converter 156 which is described later.

A/D converter 156 simultaneously converts the RF signals within the predetermined frequency band, which are received by reception unit 154, into their respective digital RF signals (in an A/D conversion).

One aspect of the embodiment is that the sampling frequency of A/D converter 156 is greater than 40 MHz. For this reason, RF signals in a bandwidth of not less than 20 MHz can be converted into digital RF signals simultaneously. This makes A/D converter 156 capable of simultaneously converting RF signals, for example in a frequency band of 87.5 MHz to 108.0 MHz, which is the frequency band for carrier waves of ground-wave radio broadcasting used in Europe, into digital RF signals.

Memory 158 includes a random access memory (RAM), a flash memory and a hard disk drive (HDD). Memory 158 holds various sets of information which are needed for the various functional units of central controller 160 to perform their processes.

Central controller 160 is made of semiconductor integrated circuits that include a central processing unit (DSP and CPU), a ROM in which programs and the like are stored, and a RAM as a work area. Central controller 160 manages and controls the entirety of radio receiver 110. In the embodiment, central controller 160 functions as mixer function units 170, radio dial selector 172, audio controller 174, data extractor 176, electronic program guide generator 178, and display controller 180 as well.

One or more mixer function units 170 are included in central controller 160. One description is provided that has, as an example, a central controller 160 that includes four mixer function units 170 (denoted by 170a to 170d in FIG. 3).

As shown in FIG. 3, each mixer function unit 170 includes mixer 182a, oscillator (local oscillator) 182b, and low-pass filter (LPF) 182c. From the digital RF signals converted by A/D converter 156, digital RF signals whose signal intensities are equal to or greater than a predetermined threshold are converted into IF signals corresponding to RF signals whose carrier frequencies are different from one another.

This conversion is particularly described with reference to FIG. 3. In the description, it is assumed that digital RF signals converted by A/D converter 156 fall within a band of 87.5 MHz to 108.0 MHz, and four mixer function units 170 are included in the central controller. Mixer function unit 170a converts one of the digital RF signals into an IF signal corresponding to a RF signal with one carrier frequency which is selected by radio dial selector 172 which is described later. Mixer function unit 170b converts some of the digital RF signals into one or more IF signals corresponding to RF signals with respective carrier frequencies within the band of 87.5 MHz to 94.3 MHz. Mixer function unit 170c converts others of the digital RF signals into one or more IF signals corresponding to RF signals with respective carrier frequencies which are included in the band of 94.4 MHz to 101.2 MHz. Mixer function unit 170d converts the others of the digital RF signals into one or more IF signals corresponding to RF signals with respective carrier frequencies which are included within the band of 101.3 MHz to 108.0 MHz.

In each mixer function unit 170, when oscillator 182b changes an oscillation frequency of a signal which oscillator 182b outputs to mixer 182a, mixer 182a can convert digital RF signals, whose carrier frequencies are different from each other, into IF signals having the same frequency (for example, 1 MHz).

Radio dial selector 172 causes any mixer function unit 170 (in this case, mixer function unit 170a) to convert one of the digital RF signals, which are converted by A/D converter 156, into a receivable IF signal corresponding to a RF signal with a carrier frequency which meets the selection input of the user through manipulation unit 150. In other words, as shown in FIG. 3, radio dial selector 172 sends the carrier frequency of radio broadcast station 102, which is selected by the user, to mixer function unit 170a, for example. In response, mixer function unit 170a converts the digital RF signal into the IF signal corresponding to the RF signal whose carrier wave has the transmitted frequency.

Audio controller 174 causes audio output unit 162 to output audio data, which is included in the one IF signal converted by mixer function unit 170 on the basis of the selection by radio dial selector 172.

Data extractor 176 extracts a set of program information from each of the IF signals, which are converted by the multiple mixer function units 170, and which correspond to the RF signals whose carrier frequencies are different from one another. In particular, data extractor 176 generates multiple sets of program data by demodulating the IF signals corresponding to the RF signals whose carrier frequencies are different from one another, and extracts sets of program information from the generated multiple sets of program data, respectively.

In this respect, data extractor 176 extracts receivable IF signals corresponding to the RF signals with the carrier frequencies from the multiple IF signals converted by the multiple mixer function units 170, and thus extracts respective sets of program information from the receivable IF signals. In the case of a HD (Hybrid Digital) radio, as is in practical use in the United States, whether or not each program is receivable is judged based on whether or not data extractor 176 can decode its program information from the corresponding IF signal in a side band.

Each set of program information represents text data which includes the name of the broadcast station, the name of the program on the air, and the like. For example, in a case where a program on the air is a music program, the program information further includes the title of the piece of music on the air, the singer's name, the composer's name, the lyricist's name, the genre, as well as the air time and the name of a disc jockey (D.J.) in addition to the name of the broadcast station and the name of the program. In a case where a program on the air is a baseball game program, the program information further includes the names and scores of the playing teams in the game on the air, the names of the batters, the names of the pitchers, and innings.

In the embodiment, data extractor 176 extracts the sets of program information, respectively, from the multiple IF signals in parallel with the process (audio output process) of audio controller 174 for causing audio output unit 162 to output the audio data, that is to say, without interrupting the process of audio controller 174.

A/D converter 156, as described above, is capable of converting the RF signals in a wide band of, for example, 20 MHz, in which the carrier waves of the ground-wave radio broadcast waves are included, into the digital RF signals simultaneously. For this reason, data extractor 176 can sequentially extract the sets of program information, respectively, from the multiple IF signals while audio controller 174 is causing audio output unit 162 to output the audio data included in the appropriate (based on the receiver's tuning) one IF signal which is among the multiple converted IF signals.

Electric program guide generator 178 generates an electronic program guide by listing the sets of program information, which are extracted by data extractor 176, in association with the carrier frequencies of the RF signals from which the sets of program information are extracted. Display controller 180 causes display 164 to display an image which represents the electronic program guide generated by electronic program guide generator 178.

Figure 4A:
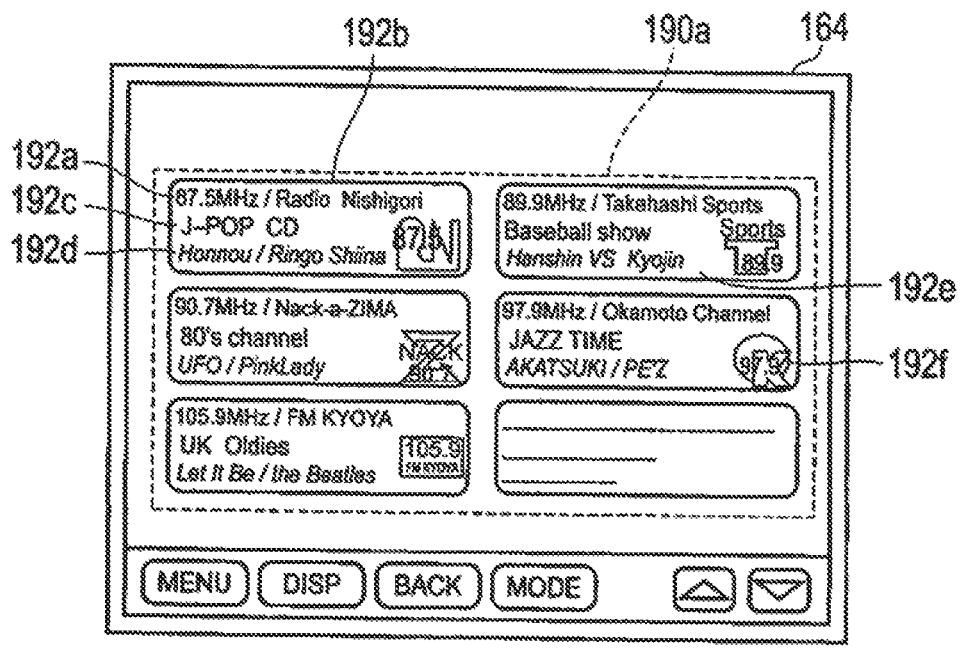
FIGS. 4A and 4B are explanatory diagrams each for explaining an electronic program guide.
Figure 4B:
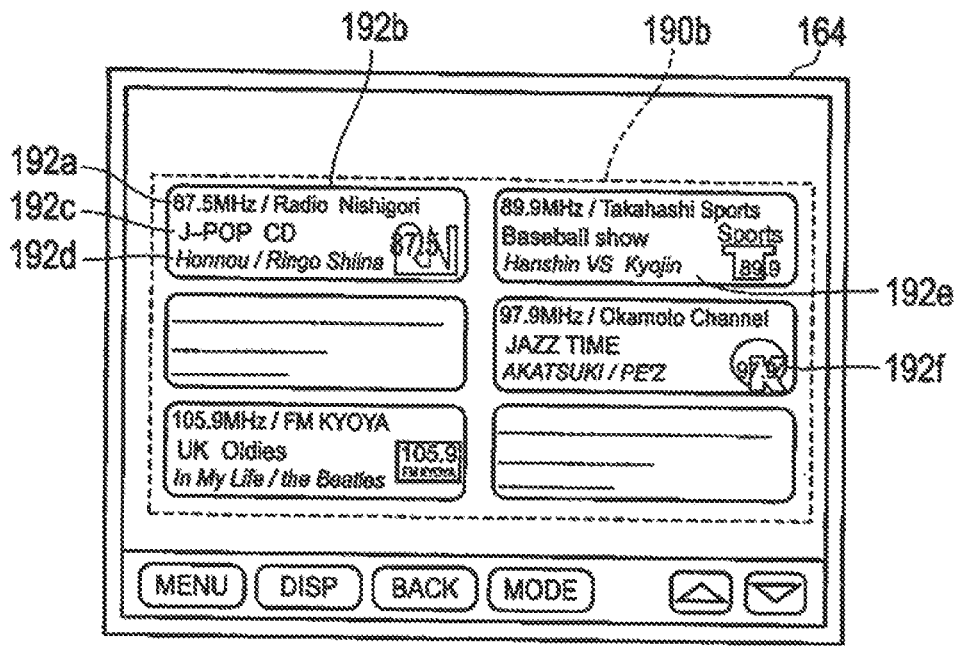

FIGS. 4A and 4B are explanatory diagrams each for explaining the electronic program guide. As shown in FIGS. 4A and 4B, display controller 180 causes display 164 to display image 190 (denoted by reference sign 190a in FIG. 4A, and denoted by reference sign 190b in FIG. 4B) which represents the electronic program guide generated by electronic guide program generator 178. Image 190, which represents the electronic program guide, includes image 192a representing the carrier frequency, image 192b representing the name of the broadcast station, image 192c representing the name of the program on the air, image 192d representing the title of the piece of music on the air and the name of the singer, and image 192e representing the names of the playing teams in a game on the air, in association with the carrier frequencies of the RF signals from which the sets of program information are extracted.

In addition, if image data on the logo and the like of radio broadcast station 102 is beforehand included in the corresponding IF signal or is retained in memory 158 in association with the carrier frequency used by radio broadcast station 102, electronic program guide generator 178 may create the electronic program guide by also associating the image data with the carrier frequency of the RF signal from which the set of program information is extracted. In this case, logo 192f of radio broadcast station 102 is included in image 190 representing the electronic program guide which display controller 180 causes display 164 to display.

Let us assume that radio receiver 110 can no longer receive a RF signal with a carrier frequency of, for example, 90.7 MHz, as a result of radio receiver 110 moving, due to the movement of movable body 106, from the place which enables radio receiver 110 to display image 190a representing the electronic program guide shown in FIG. 4A. In this case, because data extractor 176 becomes unable to extract the program information from the IF signal corresponding the 90.7-MHz RF signal, the program information on the carrier frequency of 90.7 MHz is no longer included in image 190b representing the electronic program guide which is generated by electronic program guide generator 178.

In addition, electronic program guide generator 178 updates sets of program information on receivable IF signals corresponding to RF signals with the respective carrier frequencies. In the case shown in FIG. 4B, electronic program guide generator 178 updates the sets of program information on the IF signals corresponding to the RF signals with the respective carrier frequencies of 87.5 MHz, 89.9 MHz, 97.9 MHz, and 105.9 MHz, except for the carrier frequency of 90.7 MHz.

If a program which the user selects by referring to an electronic program guide is an unreceivable program, the user is disappointed that the user cannot listen to the program of the user's choice. With this taken into consideration, electronic program guide 178 is configured to generate an electronic program guide by obtaining sets of program information from only currently receivable IF signals corresponding to RF signals with the respective carrier frequencies. For this reason, the electronic program guide includes no program information on an unreceivable program. This makes it possible to solve the problem which occurs when an electronic program guide including program information on an unreceivable program is displayed.

As opposed to displaying a limited set of program information transmitted from each television broadcast station, the display, in an embodiment of the disclosure, of a set of program information transmitted from each radio broadcast station 102 includes not only the name of the radio broadcast station and the name of the program, but also the title of a piece of music on the air, the singer's name, the composer's name, the lyricist's name, the genre, the air time, and the disc jockey's (D.J.'s) name for the case of a music program and the names and scores of the playing teams in the game on the air, the names of the batters, the names of the pitchers, and innings in the case of a baseball game program. As a result, an electronic program guide generated by electronic program guide 178 includes not only the names of programs, but also detailed sets of information on programs currently on the air (about the title of each piece of music, the name of each singer, the scores of each game and the like). For this reason, if while listening to a jazz program (for example, a program from a broadcast station whose carrier frequency is 97.9 MHz in FIG. 4A), the user checks image 190a representing the electronic program guide and happens to find that image 190a includes image 192d representing the title of a piece of music or the name of a singer favored by the user, the user can select radio broadcast station 102 which is airing the piece of music and listen to it.

Furthermore, because, as described above, data extractor 176 extracts sets of program information, respectively, from multiple IF signals without interrupting the audio output process of audio controller 174, electronic program guide generator 178 can generate an electronic program guide in real time from the sets of program information on programs currently on the air, and provide the electronic program guide to the user, while audio output unit 162 is outputting audio data.

Audio output unit 162 includes a speaker or the like, and converts audio data, which is included in the one IF signal selected by radio dial selector 172, into voice and sound under the control instruction from audio controller 174.

Display 164 includes a liquid crystal display, an organic EL (Electro Luminescence) display, a LED (Light Emitting Diode) display or the like, and displays image 190 presenting an electronic program guide under the control instruction from display controller 180.

As described above, radio receiver 110 of the embodiment is capable of simultaneously acquiring sets of program information, respectively, on one or more receivable programs of radio broadcast stations 102 by use of the one tuner (reception unit 154 and A/D converter 156), and is capable of displaying image 190 representing an electronic program guide which includes the sets of program information on the receivable programs. This enables the user to check image 190 representing the electronic program guide including only the sets of program information, respectively, on the currently receivable programs, and to avoid a situation in which the user selects a set of program information on an unreceivable program. Furthermore, radio receiver 110 is capable of updating the sets of program information while outputting audio data on a program, and accordingly is capable of generating the electronic program guide on the basis of the sets of program information, respectively, on programs on the air.

Moreover, a program is provided that is configured to cause a computer to function as radio receiver 110 with a computer-readable storage media in which the program is recorded. The computer-readable storage media include a flexible disc, a magneto-optical disc, a ROM, an EPROM, an EEPROM, a CD (Compact Disc), a DVD (Digital Versatile Disc) and a BD (Blu-ray Disc). In this respect, the program includes a series of data process software instructions which are described by use of any language and any descriptive method.

(Radio Reception Method)

Figure 5:
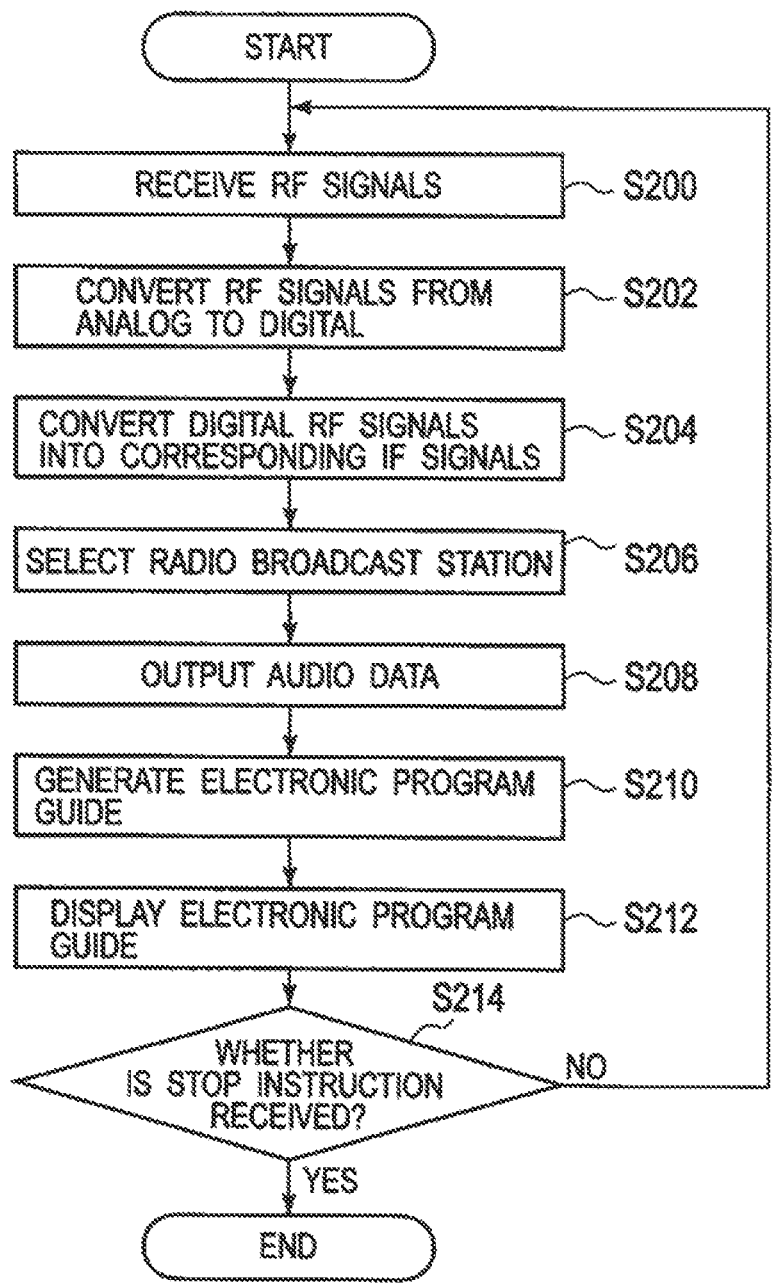
FIG. 5 is a flowchart which explains process steps of a radio reception method.
Figure 6:
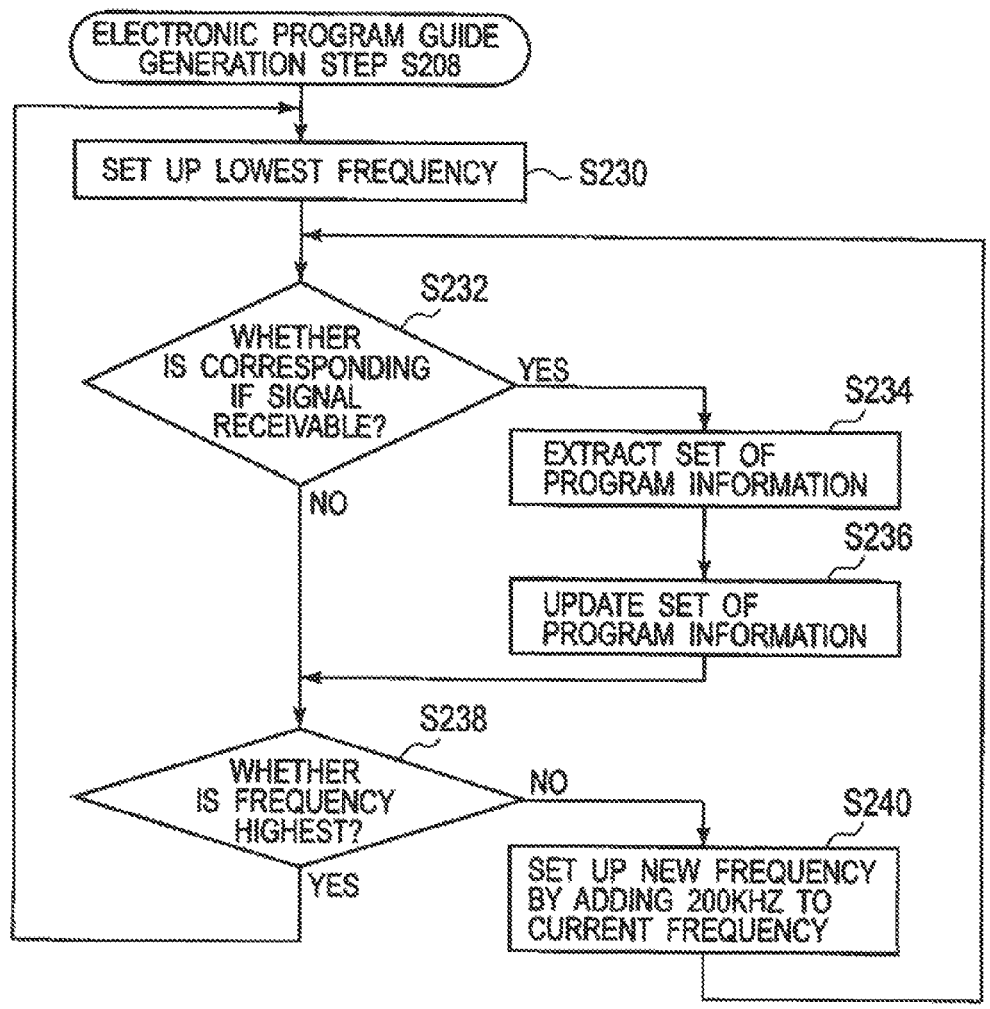
FIG. 6 is a flowchart which explains part of the process steps of the radio reception method.

FIGS. 5 and 6 are flowcharts explaining the process flow or steps of the radio reception method. As shown in FIG. 5, reception unit 154 of radio receiver 110 receives RF signals in a predetermined frequency band, inclusive of RF signals respectively having multiple carrier frequencies and broadcasted by multiple radio broadcast stations 102 (in step S200). A/D converter 156 simultaneously converts the RF signals in the predetermined frequency band, which are received by reception unit 154, into digital RF signals (in step S202). Mixer function unit 170 converts the digital RF signals into IF signals corresponding to the RF signals whose carrier frequencies are different from one another (in step S204).

Subsequently, radio dial selector 172 causes any mixer function unit 170a to convert one of the digital RF signals, which are converted in A/D conversion step S202, into a receivable IF signal corresponding to a RF signal having a carrier frequency which meets, or matches, a selection input made by the user through manipulation unit 150 (in step S206). Audio controller 174 causes audio output unit 162 to output audio data included in the one IF signal, which is converted by any mixer function unit, such as 170a, in radio dial selection step (in step S208).

On the other hand, data extractor 176 extracts sets of program information from the respective multiple IF signals, which are converted in IF conversion step S204, in parallel with audio output process step S208 by audio controller 174. Electronic program guide generator 178 generates an electronic program guide by listing the sets of program information, which are extracted by data extractor 176, in association with the respective carrier frequencies of the RF signals from which the sets of program information are extracted (in step S210). Thereafter, display controller 180 causes display 164 to display image 190 representing the generated electronic program guide (in S212). Afterward, the processes in and after reception step S200 are repeated until an instruction to stop the audio output is issued in accordance with a selection input made by the user through manipulation unit 150 (NO in step S214).

Because data extractor 176 extracts the sets of program information, respectively, from the multiple IF signals in parallel with audio output process step S208, electronic program guide generator 178 is capable of generating the electronic program guide in real time from the sets of program information on the programs currently on the air, and thereby providing the electronic program guide to the user, while audio output unit 162 is outputting the audio data.

Detailed descriptions are provided for electronic program guide generation step S210 by use of FIG. 6. In this respect, the descriptions are provided by using as an example the situation in which the digital RF signals obtained by the A/D conversion by A/D converter 156 are in the band of 87.5 MHz to 108.0 MHz. As shown in FIG. 6, first of all, mixer function unit 170 sets 87.5 MHz, which is the lowest frequency in the RF signal band among the frequencies of the respective digital RF signals converted in A/D conversion step S202, as a carrier frequency to be put to a test of IF signal conversion (in step S230). It is first judged whether or not the IF signal corresponding to the 87.5-MHz RF signal is receivable (in step S232). If the IF signal corresponding to the 87.5-MHz RF signal is receivable (Yes in step S232), mixer function unit 170 converts the 87.5-MHz RF signal into the IF signal. Data extractor 176 extracts a set of program information from the IF signal corresponding to the 87.5-MHz RF signal (in step S234). Electronic program guide generator 178 generates the electronic program guide which reflects this updating of the set of program information.

On the other hand, if it is judged that the IF signal corresponding to the 87.5-MHz RF signal is not receivable (NO in step S232), data extractor 176 informs electronic program guide generator 178 that data extractor 176 can extract no set of program information from the IF signal corresponding to the 87.5-MHz RF signal, that is to say, that there is no radio broadcast station 102 which transmits the receivable IF signal corresponding to the 87.5-MHz RF signal. With regard to 87.5 MHz, electronic program guide generator 178 places no set of program information on the electronic program guide.

Subsequently, mixer function unit 170 judges whether or not a RF signal with a carrier frequency to be put to the trial of the IF signal conversion is 108.0 MHz which is the highest frequency in the RF signal band (in step S238). If the carrier frequency on trial is not 108.0 MHz (NO in step S238), mixer function unit 170 adds, for example, 200 kHz to the carrier frequency to be put to the test of the IF signal conversion (in step S240), and performs the processes to be performed in and after reception judgment step S232. Thereby, it is possible to check whether or not a set of program information exists in each 200 kMz which is a bandwidth assigned to the carrier frequency of each radio broadcast station 102. If it is judged that the carrier frequency on trial is 108.0 MHz (YES in step S238), the processes to be performed in and after lowest frequency setup process step S230 are repeated.

As described above, the radio reception method of the embodiment also makes it possible to display image 190 representing the electronic program guide which includes only the sets of program information on the currently receivable programs, and enables the user to avoid the situation in which the user selects a set of program information on an unreceivable program. Furthermore, the radio reception method makes it possible to update sets of program information while outputting audio data on a program, and therefore makes it possible to generate the electronic program guide from the sets of program information on the programs on the air.

The foregoing descriptions are provided for the preferable embodiment of the invention by referring to the accompanying drawings. It goes without saying, however, that the invention is not limited to the embodiment. It is clear that those skilled in the art could arrive at various modifications or changes within the category described within the scope of the claims. Naturally, it should be understood that such modifications and changes belong to the technical scope of the invention.

It should be noted that the steps of the radio reception method in the description do not necessary have to be performed in the same order as the steps are listed in the flowchart or in a time sequence manner, and that the steps may include those to be performed in parallel or by use of subroutines.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A radio receiver comprising:
a reception unit configured to receive RF signals in a predetermined frequency band;
an A/D converter configured to convert the RF signals into digital RF signals;
a plurality of mixer function units configured to convert the digital RF signals into IF signals corresponding to RF signals whose carrier frequencies are different from one another;
a radio dial selector configured to cause anyone of the plurality of mixer function units to convert one of the digital RF signals into an IF signal corresponding to an RF signal whose carrier frequency matches a selection input made by a user;
an audio controller configured to cause an audio output unit to output audio data included in the converted IF signal corresponding to the RF signal whose carrier frequency matches the selection input made by the user;
a data extractor configured to extract respective sets of program information, respectively, from a plurality of converted IF signals corresponding to the RF signals whose carrier frequencies are different from one another;
an electronic program guide generator configured to generate an electronic program guide by listing the extracted sets of program information in association with the carrier frequencies of the RF signals from which the sets of program information are extracted; and
a display configured to display an image representing the electronic program guide.

2. The radio receiver according to claim 1, wherein
The data extractor is configured to extract, in parallel with the output of audio data by the audio output unit, respective sets of program information from the IF signals corresponding to the RF signals whose carrier frequencies are different from one another.

3. A radio reception method comprising:
receiving RF signals in a predetermined frequency band;
converting the received RF signals into digital RF signals;
converting the digital RF signals into IF signals corresponding to RF signals whose carrier frequencies are different from one another;
converting one of the digital RF signals into an IF signal corresponding to an RF signal whose carrier frequency matches a selection input made by a user;
causing an audio output unit to output audio data included in the converted IF signal corresponding to the RF signal whose carrier frequency matches the selection input made by the user;
extracting respective sets of program information from the converted IF signals corresponding to the RF signals whose carrier frequencies are different from one another;
generating an electronic program guide by listing the extracted sets of program information in association with the carrier frequencies of the RF signals from which the sets of program information are extracted; and
displaying an image representing the electronic program guide on a display.

4. A program for use in a computer installed in a radio receiver configured to receive RF signals in a predetermined frequency band, wherein the program is configured to cause the computer to function as:
an A/D converter configured to convert the received RF signals into digital RF signals;
a plurality of mixer function units configured to convert the digital RF signals into IF signals corresponding to RF signals whose carrier frequencies are different from one another;
a radio dial selector configured to cause any one of the plurality of mixer function units to convert one of the digital RF signals into an IF signal corresponding to an RF signal whose carrier frequency matches a selection input made by a user;
an audio controller configured to cause an audio output unit to output audio data included in the converted IF signal corresponding to the RF signal whose carrier frequency meets the manipulation input made by the user;
a data extractor configured to extract sets of program information, respectively, from a plurality of converted IF signals corresponding to the RF signals whose carrier frequencies are different from one another;
an electronic program guide generator configured to generate an electronic program guide by listing the extracted sets of program information in association with the carrier frequencies of the RF signals from which the sets of program information are extracted; and
a display configured to display an image representing the electronic program guide.

* * * * *